(12) United States Patent
Chen et al.

(10) Patent No.: US 11,747,527 B2
(45) Date of Patent: *Sep. 5, 2023

(54) OPTICAL ASSEMBLY AND THE METHOD TO MAKE THE SAME

(71) Applicant: UBRIGHT OPTRONICS CORPORATION, Taoyuan County (TW)

(72) Inventors: Hui-Yong Chen, Taoyuan County (TW); Lung-Pin Hsin, Taoyuan County (TW); Yi-Long Tyan, Taoyuan County (TW); Yu-Mei Juan, Taoyuan County (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 282 days.

This patent is subject to a terminal disclaimer.

(21) Appl. No.: 16/732,343

(22) Filed: Jan. 1, 2020

(65) Prior Publication Data

US 2020/0132893 A1  Apr. 30, 2020

Related U.S. Application Data

(63) Continuation of application No. 15/344,590, filed on Nov. 7, 2016, now Pat. No. 10,613,258.

(60) Provisional application No. 62/393,667, filed on Sep. 13, 2016.

(51) Int. Cl.
*G02B 5/02* (2006.01)
*B29D 11/00* (2006.01)
*B32B 37/12* (2006.01)

(52) U.S. Cl.
CPC ...... *G02B 5/0268* (2013.01); *B29D 11/00788* (2013.01); *B32B 37/12* (2013.01); *G02B 5/0231* (2013.01); *B29D 11/0073* (2013.01); *B32B 2551/00* (2013.01); *G02B 5/0242* (2013.01)

(58) Field of Classification Search
CPC .......... G02B 5/00; G02B 5/02; G02B 5/0205; G02B 5/0236; G02B 5/0242; G02B 5/0268; G02B 5/0273; G02B 5/0278; G02B 5/04; B29D 11/0073; B29D 11/00788; B32B 37/12
USPC .................................................. 359/599, 601
See application file for complete search history.

(56) References Cited

U.S. PATENT DOCUMENTS

| | | | | |
|---|---|---|---|---|
| 7,478,913 B2* | 1/2009 | Epstein | ............. | G02F 1/133606 362/330 |
| 7,961,278 B2* | 6/2011 | Ohta | ................. | G02F 1/133606 349/64 |
| 10,613,258 B2* | 4/2020 | Chen | ................ | B29D 11/00788 |
| 2008/0049330 A1* | 2/2008 | Tolbert | ............. | G02F 1/133606 359/599 |
| 2009/0213464 A1* | 8/2009 | Kurachi | ............... | G02B 5/0242 156/308.4 |
| 2013/0004728 A1* | 1/2013 | Boyd | ..................... | F21V 11/00 359/485.01 |

(Continued)

Primary Examiner — Thong Q Nguyen
(74) Attorney, Agent, or Firm — Min-Lee Teng

(57) ABSTRACT

An optical assembly, comprising: a first optical film; an adhesive layer, wherein the adhesive layer is disposed on the first optical film, wherein the adhesive layer comprises a plurality of light-diffusing particles therein; and a second optical film comprising a plurality of microstructures that are boned to the adhesive layer without penetrating into the adhesive layer.

7 Claims, 8 Drawing Sheets

(56) References Cited

U.S. PATENT DOCUMENTS

2015/0153494 A1* 6/2015 Kim .................. G02B 5/0215
362/19
2017/0315403 A1* 11/2017 Kashiwagi ........... G02B 6/0051

* cited by examiner

OPTICAL ASSEMBLY AND THE METHOD TO MAKE THE SAME

CROSS-REFERENCE TO RELATED APPLICATIONS

This application is a continuation of U.S. application Ser. No. 15/344,590 filed on Nov. 7, 2016, now U.S. Pat. No. 10,613,258, which claims the benefit of U.S. provisional patent application No. 62/393,667, filed on Sep. 13, 2016, which is hereby incorporated herein by reference.

BACKGROUND OF THE INVENTION

1. Field of the Invention

The present invention relates to an optical assembly, and more particularly to an optical assembly combined with an adhesive.

2. Description of Related Art

FIG. 1 illustrates a schematic cross-sectional view of an adhesive optical assembly 10. The optical assembly 10 includes a bottom prism sheet 11 and a top prism sheet 12 disposed over the bottom prism sheet 11. Conventionally, coat a liquid adhesive layer 13 on the bottom surface of the top prism sheet 12, insert the prisms 14 of the bottom prism sheet 11 into the adhesive layer 13 and subsequently perform a heat treatment process or a UV illumination process on the adhesive layer 13 so that the adhesive layer 13 proceeds to a crosslink reaction to finish the adhesion between the bottom prism sheet 11 and the top prism sheet 12. It is advantageous that inserting the prisms 14 of the bottom prism sheet 11 into the adhesive layer 13 guarantees that there is enough contact area between the adhesive layer 13 and the prisms 14 of the bottom prism sheet 11 to provide the adhesive stability of the optical assembly 10. However, inserting the prisms 14 of the bottom prism sheet 11 into the adhesive layer 13 can reduce the exposed surface area of the prisms 14 of the bottom prism sheet 11 such that the brightness of the adhesive optical assembly 10 decreases. Besides, because the adhesive layer 13 is in the liquid phase before adhesion, it is easy to see the obvious "wick phenomenon" 15 (i.e. capillarity phenomenon, the adhesive layer 13 seriously adheres to two sides of the prismatic tip). Wick phenomenon 15 can also reduce the exposed surface area of the prisms 14 of the bottom prism sheet 11 and lead to the loss of the brightness.

Accordingly, the present invention proposes an optical assembly and its manufacturing method to overcome the above-mentioned disadvantages.

SUMMARY OF THE INVENTION

The present invention provides an optical assembly and a method for manufacturing the optical assembly with the plurality of microstructures of the bottom optical film being not penetrated into the adhesive layer disposed on the bottom surface of the top optical film, which can effectively control the contact area of the adhesion to avoid wick phenomenon in the adhesion process to further improve the brightness of the optical assembly and guarantee enough adhesive strength between the top optical film and the bottom optical film of the optical assembly.

In one embodiment, the present invention discloses an optical assembly comprising: a first optical film having a first surface; an adhesive layer having a second surface and a third surface opposite to the second surface, wherein the second surface of the adhesive layer is disposed on the first surface of the first optical film; and a second optical film comprising a plurality of microstructures, wherein each of at least one of the plurality of microstructures is bonded to the third surface of the adhesive layer with the plurality of microstructures being not penetrated into the adhesive layer.

In one embodiment, the present invention discloses an optical assembly comprising: a first optical film having a first surface; an adhesive layer having a second surface and a third surface opposite to the second surface, wherein the second surface of the adhesive layer is disposed on the first surface of the first optical film, wherein the adhesive layer comprises a thermally-curable material having a plurality of first acrylate functional groups; and a second optical film comprising a plurality of microstructures, wherein each of the plurality of microstructures has a top planar surface having a plurality of second acrylate functional groups, wherein the top planar surface is bonded to the third surface of the adhesive layer by the bonding between the plurality of first acrylate functional groups and the plurality of second acrylate functional groups formed in an illumination process while the thermally-curable material of the adhesive layer has been thermally-cured for preventing the top planar surface from penetrating into the adhesive layer.

In one embodiment, the present invention discloses an optical assembly comprising: a first optical film having a first surface; an adhesive layer having a second surface and a third surface opposite to the second surface, wherein the second surface of the adhesive layer is disposed on the first surface of the first optical film, wherein the adhesive layer comprises a thermally-curable material having a plurality of first functional groups; and a second optical film comprising a plurality of microstructures, wherein each of at least one of the plurality of microstructures has a top planar surface having a plurality of second functional groups, wherein the top planar surface is bonded to the third surface of the adhesive layer by the bonding between the plurality of first functional groups and the plurality of second functional groups formed in an illumination process while the thermally-curable material of the adhesive layer has been thermally-cured for preventing the top planar surface from penetrating into the adhesive layer.

Preferably, each of the microstructures has a top planar surface bonded to the third surface of the adhesive layer in the above embodiments.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

The present invention discloses an optical assembly where the microstructure of the second optical film has a top surface bonded to the adhesive layer disposed on the bottom surface of the first optical film without penetrating the microstructure of the second optical film into the adhesive layer.

Embodiment 1

Figure 1:
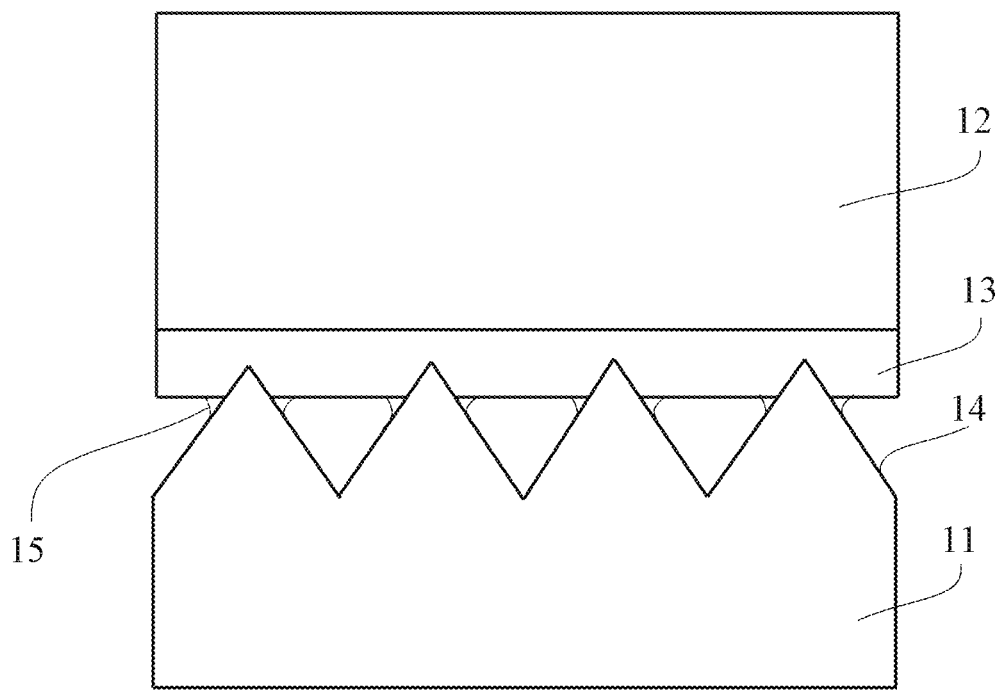
FIG. 1 illustrates a schematic cross-sectional view of an adhesive optical assembly.
Figure 2:
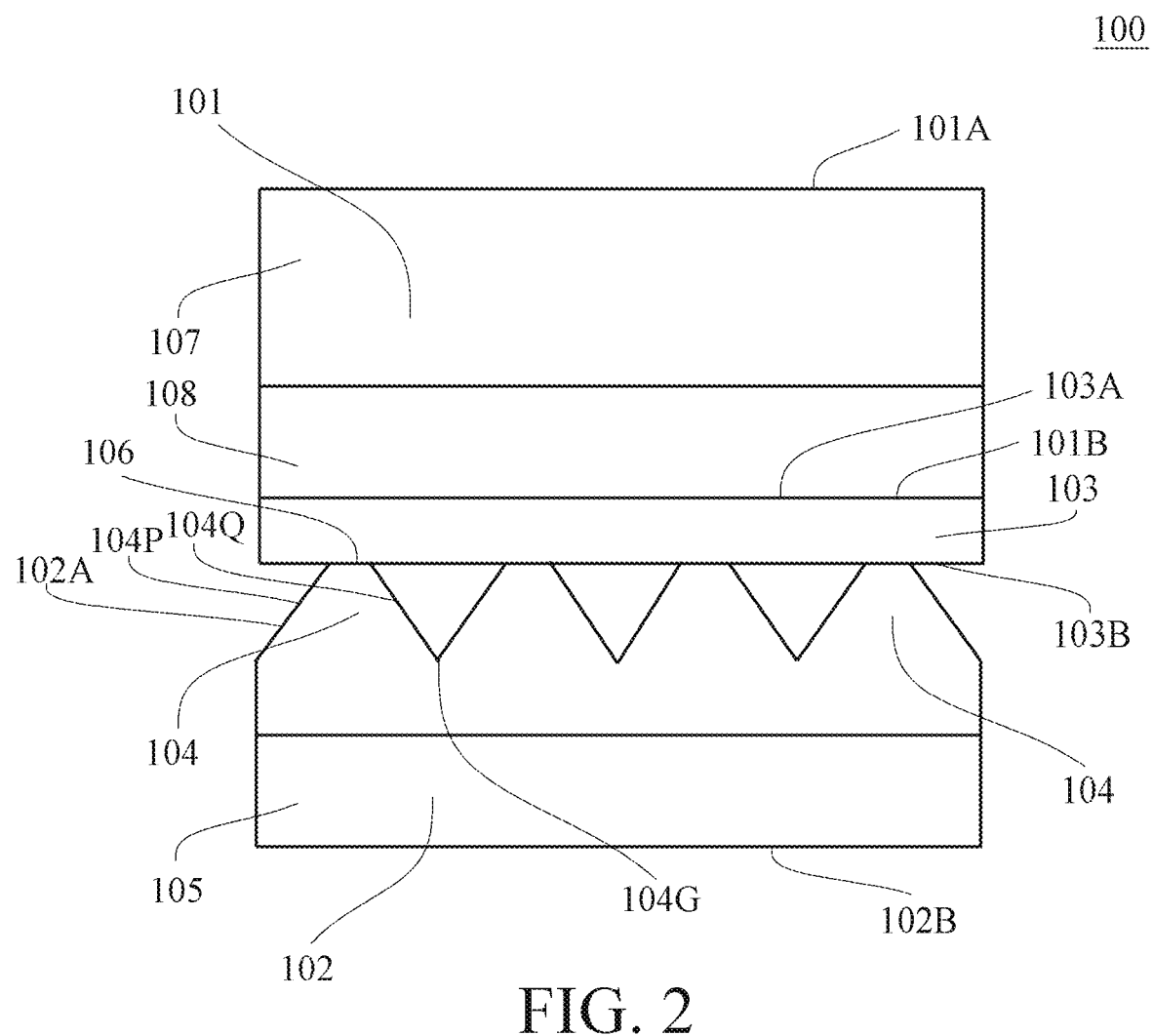
FIG. 2 illustrates a schematic cross-sectional view of an optical assembly in the first embodiment of the present invention.

FIG. 2 illustrates a schematic cross-sectional view of an optical assembly 100 in the first embodiment of the present invention. The optical assembly 100 comprises a first optical film 101, a second optical film 102 and an adhesive 103 between the first optical film 101 and the second optical film 102. The first optical film 101 has a top surface 101A and a bottom surface 101B. The adhesive layer 103 has a top surface 103A and a bottom surface 103B. The top surface 103A of the adhesive layer 103 is disposed on the bottom surface 101B of the first optical film 101. The adhesive layer 103 comprises a thermally-curable material having a plurality of first acrylate functional groups. The thermally-curable material can include many ingredients mixed together each of which respectively has a chemical formula. The thermally-curable material can also merely include a single ingredient which has a chemical formula comprising a thermally-curable portion and at least one first acrylate functional group bonded to the thermally-curable portion. The second optical film 102 has a top structured surface 102A and a bottom surface 102B. The top structured surface 102A of the second optical film 102 comprises a plurality of microstructures 104. Optionally, the second optical film 102 can further comprise a substrate 105 (e.g., PET substrate) and the microstructures 104 disposed on the substrate 105. Each of at least one of microstructures 104 has a top planar surface 106 having a plurality of second acrylate functional groups. The top planar surface 106 is bonded to the bottom surface 103B of the adhesive layer 103 by the bonding between the first acrylate functional groups and the second acrylate functional groups formed in an illumination process (e.g., photo-curable or UV-curable process) while the thermally-curable material of the adhesive layer 103 has been thermally-cured for preventing the top planar surface 106 from penetrating into the adhesive layer 103. Preferably, each of the microstructures 104 has a top planar surface 106 bonded to the bottom surface 103B of the adhesive layer 103 by the bonding between the first acrylate functional groups and the second acrylate functional groups formed in the illumination process (e.g., photo-curable or UV-curable process) while the thermally-curable material of the adhesive layer 103 has been thermally-cured for preventing the top planar surface 105 from penetrating into the adhesive layer 103. The adhesive force between the first optical film 101 and the second optical film 102 can be more than 10 g/25 mm, or more than 20 g/25 mm, or more than 60 g/25 mm, or more than 70 g/25 mm, or more than 80 g/25 mm.

Each microstructure 104 of the second optical film 102 can be a prism, a lenticular lens or a microlens. In one embodiment, the second optical film 102 comprises a plurality of microstructures 104 extending substantially along a first direction. The first direction can be the length direction of the microstructure 104, preferably perpendicular to the width direction (e.g., the cross-section direction) of the microstructure 104. The height of the microstructure 104 can varies along the first direction. The top planar surface 106 of the microstructure 104 can be also changed to comprise a plurality of elevating portions 106A (may have a constant height) and a plurality of non-elevating portions 106B (may have a constant height) alternating with the plurality of elevating portions 106A, and the elevating portions 106A of the top planar surface 106 is bonded to the bottom surface 103B of the adhesive layer 103 (see FIG. 3). The microstructure 104 can have a linear length, a meandering length or a wavelength. Preferably, the top planar surface 106 of each microstructure 104 of the second optical film 102 is bonded to the bottom surface 103B of the adhesive layer 103; more preferably, each microstructure 104 of the second optical film 102 is a prism. The prism 104 of the second optical film 102 has a pair of opposing facets 104P, 104Q on two sides of the top planar surface 106 thereof. The facets of the adjacent prisms 104 descend to form the groove 104G (or valley). Preferably, the dihedral angle defined by the extending faces of the opposing facets 104P, 104Q of the prism 104 can be the same through the entire prism 104.

Figure 3:
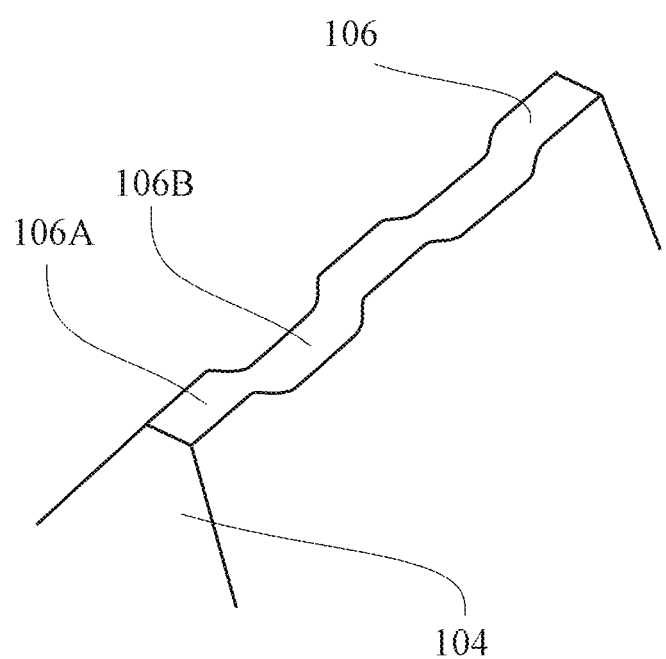
FIG. 3 illustrates that the top planar surface of the microstructure can be also changed to comprise a plurality of elevating portions (may have a constant height) and a plurality of non-elevating portions (may have a constant height) alternating with a plurality of elevating portions.
Figure 4A:
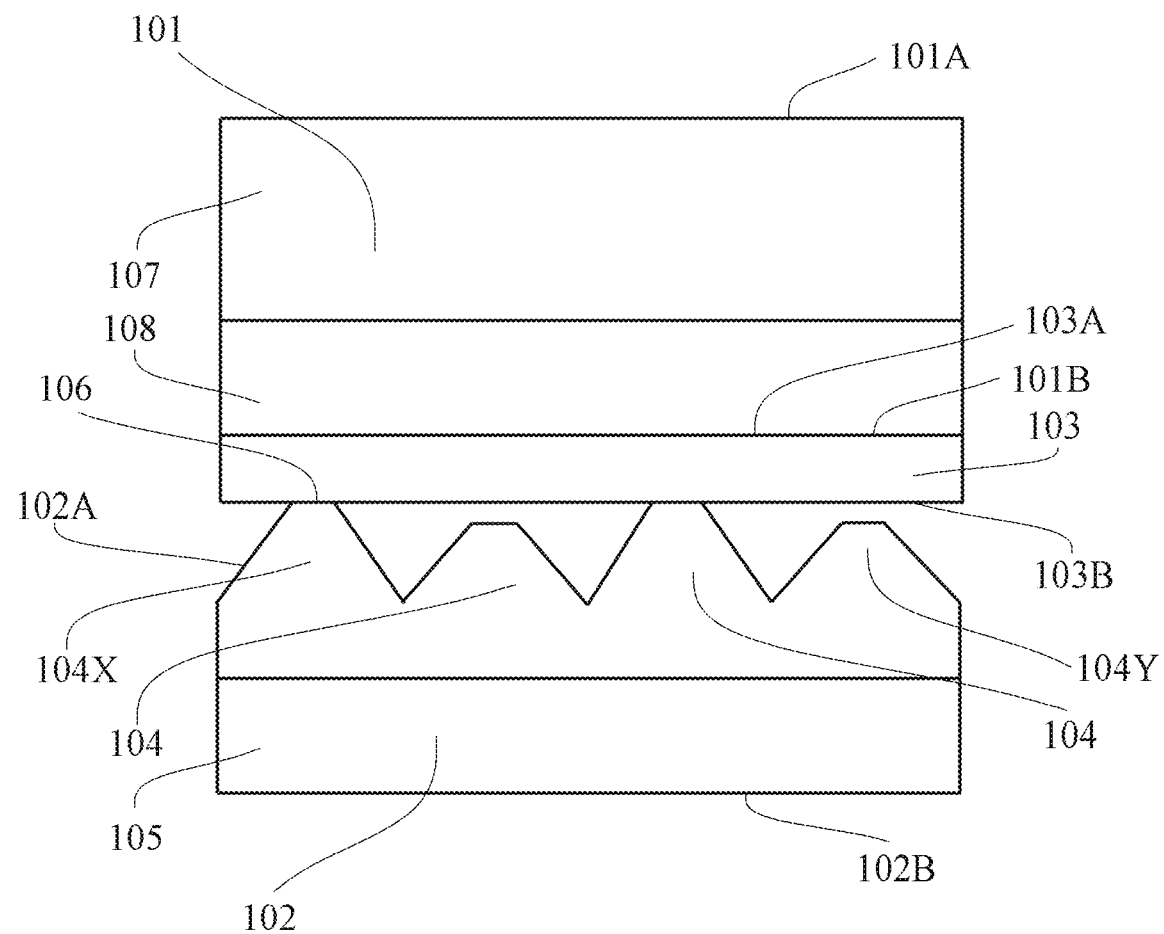
FIG. 4A illustrates that "the top planar surface of each microstructure of a portion of the microstructures of the second optical film is bonded to the bottom surface of the adhesive layer "and "the top planar surface of each microstructure of another portion of the microstructures of the second optical film is not bonded to the bottom surface of the adhesive layer"
Figure 4B:
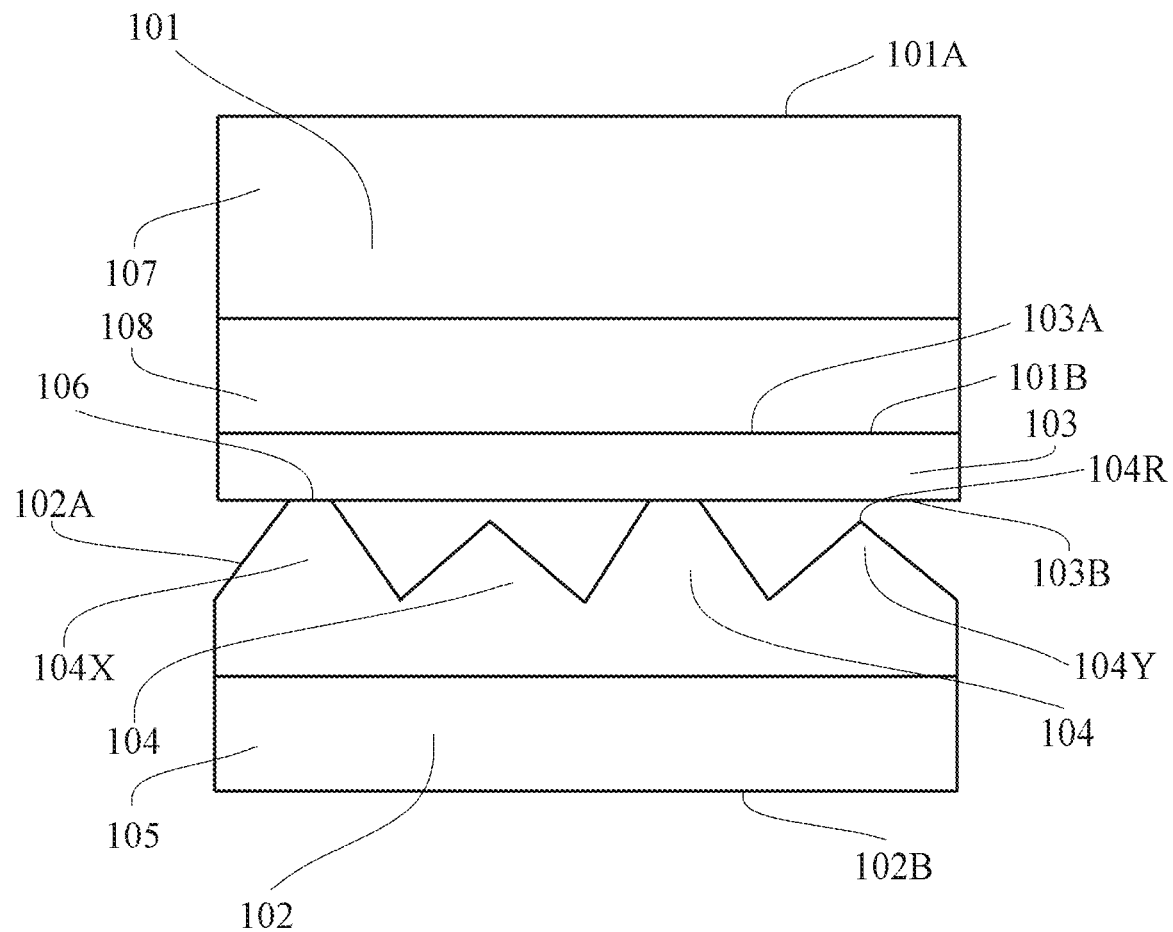
FIG. 4B illustrates that "the top planar surface of each prism of a portion of the prisms of the second optical film is bonded to the bottom surface of the adhesive layer" and "each prism of another portion of the prisms of the second optical film is not bonded to the bottom surface of the adhesive layer and has no top planar surface"

In one embodiment, the second optical film 102 comprises a plurality of microstructures 104 (e.g., prism, lenticular lens or microlens) extending substantially along a first direction, the top planar surface 106 of each microstructure 104 (maybe a constant-height microstructure or also changed to a height-varying microstructure in FIG. 3) of a portion 104X of the microstructures 104 of the second optical film 102 is bonded to the bottom surface 103B of the adhesive layer 103, and the top planar surface 106 of each microstructure 104 of another portion 104Y of the microstructures 104 of the second optical film 102 is not bonded to the bottom surface 103B of the adhesive layer 103 (see FIG. 4A). In another embodiment, the second optical film 102 comprises a plurality of prisms 104 extending substantially along a first direction, the top planar surface 106 of each prism 104 (maybe a constant-height prism or also changed to a height-varying prism 104 in FIG. 3) of a portion 104X of the prisms 104 of the second optical film 102 is bonded to the bottom surface 103B of the adhesive layer 103, and each prism 104 (the opposing facets 104P, 104Q intersect to form the ridge 104R of the prism; preferably, the dihedral angle defined by the opposing facets 104P, 104Q of the prism 104 is the same through the entire prism 104) of another portion 104Y of the prisms 104 of the second optical film 102 is not bonded to the bottom surface 103B of the adhesive layer 103 and has no top planar surface 106 so as to largely increase the brightness (i.e. optical gain) of optical assembly 100 (see FIG. 4B).

The first optical film 101 can be any suitable optical film, such as light enhancement film, diffusing sheet, DBEF (Dual Brightness Enhancement Film), and so on. The first optical film 101 can further comprise a substrate 108 (e.g., PET substrate) and the plurality of microstructures 107 on the substrate 108. Each microstructure 108 of the first optical film 101 can be a prism, a lenticular lens or a microlens. In the preferred embodiment, the first optical film 101 comprises a plurality of microstructures 107 extending substantially along a second direction perpendicular to the first direction.

The adhesive layer 103 can be made of a unitary/homogeneous material. Optionally, the unitary/homogeneous material can include light-diffusing particles or can't include light-diffusing particles. The thickness of the adhesive layer 103 can be 0.1~10 μm or 0.1~5 μm, preferably, 0.1~2 more preferably, 0.5~1 μm. The bottom surface 103B of the adhesive layer 103 can be a structured surface according to U.S. provisional application Ser. No. 62/372,315, which had been incorporated by reference therein.

The specific manufacturing method is described as follows. For the convenience of explanation, only the manufacturing method for the prisms 104 of the second optical film 102 bonded to the adhesive layer 103 is described. The manufacturing method can be also applied to other microstructures 104 of the second optical film 102, such as a lenticular lens or a microlens.

In the beginning, dispose the adhesive layer 103 on the bottom surface 101B of the first optical film 101. The adhesive layer 103 comprises a thermally-curable material having a plurality of first acrylate functional groups. The adhesive layer 103 proceeds a thermally-curable crosslink reaction before the adhesion between the first optical film 101 and the second optical film 102, and then the prisms 104 of the second optical film 102 are adhered to the adhesive layer 103. At this time, the adhesive layer 103 has been cured because the thermally-curable material of the adhesive layer 103 has been thermally-cured after the thermally-curable crosslink reaction, so the prisms 104 of the second optical film 102 can't be inserted into the adhesive layer 103. It is noted that "the adhesive layer 103 has been cured" can also mean "the adhesive layer 103 is cured to a certain degree such that the prisms 104 of the second optical film 102 can't be inserted into the adhesive layer 103". In order to meet the above requirement, the weight ratio of the thermally-curable material to the adhesive layer 103 can be more than 50%, or more than 55%, or more than 60%, or more than 70%, or more than 80%, or more than 90%. Besides, the adhesive layer 103 which has been cured has no flowability, so the adhesive layer 103 has no adsorption on two sides of the prismatic tip so as to largely improve the brightness of the optical assembly 100. The brightness of the optical assembly 100 can be at least 1.7, preferably, at least 1.8. In order to increase the adhesive force between the adhesive layer 103 and the prisms 104 of the second optical film 102, the first embodiment of the present invention adopts: (a) the top of the prism 104 of the second optical film 102 can be designed to have a top planar surface 106 (i.e. the top of the prism 104 is changed from a ridge line to a planar surface 106); and (b) the thermally-curable material of the adhesive layer 103 has a plurality of first acrylate functional groups and the prisms 104 of the second optical sheet 102 has a plurality of second acrylate functional groups such that the first acrylate functional groups of the adhesive layer 103 and the second acrylate functional groups of the top planar surface 106 of the prism 104 of the second optical sheet 102 can proceed a photo-curable crosslink reaction to provide enough chemical bonding between the adhesive layer 103 and the prisms 104 of the second optical film 102 to further improve the adhesive force. The thermally-curable material of the adhesive layer 103 still has a lot of first active acrylate functional groups after the thermally-curable material of the adhesive layer 103 has been cured, and the top planar surface 106 of the prism 104 of the second optical film 102 has a lot of second active acrylate functional groups (preferably, the prism 104 of the second optical film 102 is not completely cured after the initial illumination). The top planar surface 106 of the prism 104 of the second optical film 102 is bonded to the adhesive layer 103 by performing an illumination process to form the bonding between the first active acrylate functional groups of the thermally-curable material of the adhesive layer 103 and the second active acrylate functional groups of the prism 104 of the second optical film 102 (until the prism 104 of the second optical film 102 has been cured) while the thermally-curable material of the adhesive layer 103 has been thermally-cured for preventing the top planar surface 106 of the prism 104 of the second optical film 102 from penetrating into the adhesive layer 103; therefore, the adhesive force between the adhesive layer 103 and the prisms 104 of the second optical film 102 can be improved a lot without penetrating the prisms 104 of the second optical film 102 into the adhesive layer 103. The adhesive force can be at least 40 g/25 mm, preferably, at least 96 g/25 mm.

In one embodiment, the adhesive layer 103 can comprise a thermally-curable material having a plurality of first acrylate functional groups and a photo-curable material having a plurality of third acrylate functional groups. The illumination process can be also effectively performed to form the bonding between the adhesive layer 103 and the prism 104 of the second optical film 102. More advantageously, the bonding between the third active acrylate functional groups of the photo-curable material of the adhesive layer 103 and the second active acrylate functional groups of the prism 104 of the second optical film 102 can be formed in the illumination process, so the adhesive force between the adhesive layer 103 and the prisms 104 of the second optical film 102 can be improved more than the above embodiment without penetrating the prism 104 of the second optical film 102 into the adhesive layer 103.

The top planar surface 106 of the prism 104 of the second optical film 102 having a smaller width can't provide enough adhesive force. The top planar surface 106 of the prism 104 of the second optical film 102 having a larger width will reduce the brightness. Therefore, the width of the top planar surface 106 of the prism 104 of the second optical film 102 can be 0.5~10 μm, preferably, 1~5 μm, more preferably, 2~4 μm. The top planar surface 106 of the prism 104 of the second optical film 102 can be formed by film-embossing of the mold cut by a knife having a top flat edge corresponding to the top planar surface 106 of the prism 104. For effectively increasing brightness, only a portion of the prisms 104 of the second optical film 102 is bonded to the adhesive layer 103. The top planar surface 106 of the prism 104 of the second optical film 102 is used to increase the contact area contacting the adhesive layer 103 for increasing the adhesive force. However, the present invention is not limited to this case. As long as the top of the prism 104 of the second optical film 102 can provide a larger contact area for increasing the adhesive force, the top of the prism 104 of the second optical film 102 is not limited to any shape. For example, the bottom surface 103B of the adhesive layer 103 is a structured surface and the top of the prism 104 of the second optical film 102 has a shape corresponding to the structured bottom surface 103B of the adhesive layer 103 (preferably, the adhesive layer is made of a unitary/homogeneous material; optionally, the unitary/homogeneous material can include light-diffusing particles or can't include light-diffusing particles). In one embodiment, the bottom surface 103B of the adhesive layer 103 is a structured surface according to U.S. patent application Ser. No. 15/247,901 (second convex or concave shapes superimposed on first convex shapes) or U.S. provisional application Ser. No. 62/372,315 and the top of the prism 104 of the second optical film 102 has a shape corresponding to the structured bottom surface 103B of the adhesive layer 103. For effectively diffusing light and increasing brightness at the same time, only a portion of the prisms 104 of the second optical film 102 are bonded to the adhesive layer 103, which can be referred to U.S. provisional application Ser. No. 62/372,315. All kinds of configurations of the prisms 104 of the second optical film 102 in U.S. provisional application Ser. No. 62/372,315 can be incorporated by reference therein.

If the adhesive force is enough (i.e. there is strong chemical bonding between the adhesive layer 103 and the prisms 104 of the second optical film 102), the top of the prism 104 of the second optical film 102 previously described can have no top planar surface 106 (i.e. the prism 104 of the second optical film 102 is a regular prism or a triangular prism) to improve the brightness of the optical assembly 100.

The chemical formula of the thermally-curable material (or the photo-curable material) of the adhesive layer 103 can be $R_1$-$F_1$. The main chain $R_1$ can be a long carbon chain, an aromatic compound, a benzene-ring compound or a soft Polyurethane (PU) compound, and so on. The reactive functional group $F_1$ can be one acrylate functional group, two acrylate functional groups, three acrylate functional groups or more acrylate functional groups, and so on. The chemical formula of the material of the prisms 104 of the second optical film 102 can be $R_2$-$F_2$. The main chain $R_2$ can be a long carbon chain, an aromatic compound, a benzene-ring compound or a soft Polyurethane PU compound, and so on. The reactive functional group $F_2$ can be one acrylate functional group, two acrylate functional groups, three acrylate functional groups or more acrylate functional groups, and so on. In the preferred embodiment, the bonding between the first acrylate functional groups of the thermally-curable material (or the third acrylate functional groups of the photo-curable material) of the adhesive layer 103 and the second acrylate functional groups of the prism 104 of the second optical film 102 are formed by respectively changing a first C—C double bond of the first acrylate functional group (or a third C—C double bond of the third acrylate functional group) and a second C—C double bond of the second acrylate functional group to a C—C single bond to form a C—C single bond between the first acrylate functional group and the second acrylate functional group (or between the third acrylate functional group and the second acrylate functional group). However, the present invention is not limited to this case; for example, at least one of the first C—C double bonds and the second C—C double bond can also come from the other functional group. The weight ratio of the thermally-curable material or the photo-curable material having acrylate functional groups to the adhesive layer 103 can be more than 40%, or more than 50%, or more than 55%, or more than 60%, or more than 70%, or more than 80%, or more than 90%.

The present invention is not also limited to the bonding between the first acrylate functional groups of the thermally-curable material (or the third acrylate functional groups of the photo-curable material) of the adhesive layer 103 and the second acrylate functional groups of the prism 104 of the second optical film 102. As long as the bonding between the thermally-curable material (or the photo-curable material) of the adhesive layer 103 and the prism 104 of the second optical film 102 can be formed in the illumination process while the thermally-curable material of the adhesive layer 104 has been thermally-cured for preventing the top planar surface 106 from penetrating into the adhesive layer 103 to improve the adhesive force and the brightness, the first acrylate functional groups of the thermally-curable material (or the third acrylate functional groups of the photo-curable material) of the adhesive layer 103 and the second acrylate functional groups of the prism 104 of the second optical film 102 can be respectively replaced by any suitable functional groups. For example, the thermally-curable material (or the photo-curable material) of the adhesive layer 103 can have an epoxy functional group and the prisms 104 of the second optical film 102 can have a hydroxyl functional group such that the hydroxyl functional group can open the O-ring of the epoxy functional group to form bonding between the adhesive layer 103 and the prisms 104 of the second optical film 102. On the contrary, the thermally-curable material (or the photo-curable material) of the adhesive layer 103 can have a hydroxyl functional group and the prisms 104 of the second optical film 102 can have an epoxy functional group such that the hydroxyl functional group can open the O-ring of the epoxy functional group to form bonding between the adhesive layer 103 and the prisms 104 of the second optical film 102.

Embodiment 2

Please refer back to FIG. 2, and FIG. 2 also illustrates a schematic cross-sectional view of an optical assembly 100 in the second embodiment of the present invention. Compared to the first embodiment, the adhesive layer 103 of the second embodiment comprises a photo-curable material having a plurality of first acrylate functional groups; therefore, the features in the first embodiment can be correspondingly applied to the second embodiment and it doesn't further describe again. Perform a first photo-curable process on the photo-curable material of the adhesive layer 103. The adhesive layer 103 proceeds a photo-curable crosslink reaction before the adhesion between the first optical film 101 and the second optical film 102, and then the prisms 104 of the second optical film 102 are adhered to the adhesive layer 103. At this time, the adhesive layer 103 is cured to a certain degree such that the prisms 104 of the second optical film 102 can't be inserted into the adhesive layer 103. Besides, the adhesive layer 103 has no flowability, so the adhesive layer 103 has no adsorption on two sides of the prismatic tip so as to largely improve the brightness. The brightness can be at least 1.7, preferably, at least 1.8. In order to increase the adhesive force between the adhesive layer 103 and the prisms 104 of the second optical film 102, the second embodiment of the present invention adopts: (a) the top of the prism 104 of the second optical film 102 can be designed to have a top planar surface 106 (i.e. the top of the prism 104 is changed from a ridgeline to a planar surface 106); and (b) the photo-curable material of the adhesive layer 103 has a plurality of first acrylate functional groups and the prisms 104 of the second optical sheet 102 has a plurality of second acrylate functional groups such that the first acrylate functional groups of the adhesive layer 103 and the second acrylate functional groups of the top planar surface 106 of the prism 104 of the second optical sheet 102 can proceed another photo-curable crosslink reaction to provide enough chemical bonding between the adhesive layer 103 and the prisms 104 of the second optical film 102 to further improve the adhesive force. The photo-curable material of the adhesive layer 103 still has a lot of first active acrylate functional groups after the photo-curable material of the adhesive layer 103 is cured to a certain degree such that the prisms 104 of the second optical film 102 can't be penetrated into the adhesive layer 103 and the top planar surface 106 of the prism 104 of the second optical film 102 has a lot of second active acrylate functional groups (preferably, the prism 104 of the second optical film 102 is not completely cured after the initial illumination). The top planar surface 106 of the prism 104 of the second optical film 102 is bonded to the adhesive layer 103 by performing an illumination process to form the bonding between the first active acrylate functional groups of the photo-curable material of the adhesive layer 103 and the second active acrylate functional groups of the prism 104 of the second optical film 102 (until the prism of the second optical film 102 has been cured) while the photo-curable material of the adhesive layer is photo-cured to a certain degree for preventing the top planar surface 106 of the prism 104 of the second optical film 102 from penetrating into the adhesive layer 103; therefore, the adhesive force between the adhesive layer 103 and the prisms 104 of the second optical film 102 can be improved a lot without penetrating the prisms 104 of the second optical film 102 into the adhesive layer 103. The adhesive force can be at least 40 g/25 mm, preferably, at least 96 g/25 mm.

The chemical formula of the photo-curable material of the adhesive layer 103 can be $R_3$-$F_3$. The main chain $R_3$ can be a long carbon chain, an aromatic compound, a benzene-ring compound or a soft Polyurethane (PU) compound, and so on. The reactive functional group $F_3$ can be one acrylate functional group, two acrylate functional groups, three acrylate functional groups or more acrylate functional groups, and so on. The chemical formula of the material of the prisms 104 of the second optical film 102 can be $R_4$-$F_4$. The main chain $R_4$ can be a long carbon chain, an aromatic compound, a benzene-ring compound or a soft Polyurethane PU compound, and so on. The reactive functional group $F_4$ can be one acrylate functional group, two acrylate functional groups, three acrylate functional groups or more acrylate functional groups, and so on. In the preferred embodiment, the bonding between the first acrylate functional groups of the photo-curable material of the adhesive layer 103 and the second acrylate functional groups of the prism 104 of the second optical film 102 are formed by respectively changing a first C—C double bond of the first acrylate functional group and a second C—C double bond of the second acrylate functional group to a C—C single bond to form a C—C single bond between the first acrylate functional group and the second acrylate functional group. However, the present invention is not limited to this case; for example, at least one of the first C—C double bonds and the second C—C double bond can also come from the other functional group. The weight ratio of the photo-curable material having acrylate functional groups to the adhesive layer 103 can be more than 40%, or more than 50%, or more than 55%, or more than 60%, or more than 70%, or more than 80%, or more than 90%.

The present invention is not also limited to the bonding between the first acrylate functional groups of the photo-curable material of the adhesive layer 103 and the second acrylate functional groups of the prism 104 of the second optical film 102. As long as the bonding between the photo-curable material of the adhesive layer 103 and the prism 104 of the second optical film 102 can be formed in the illumination process while the photo-curable material of the adhesive layer 104 has been photo-cured to a certain degree for preventing the top planar surface 106 from penetrating into the adhesive layer 103 to improve the adhesive force and the brightness, the first acrylate functional groups of the photo-curable material of the adhesive layer 103 and the second acrylate functional groups of the prism 104 of the second optical film 102 can be respectively replaced by any suitable functional groups. For example, the photo-curable material of the adhesive layer 103 can have an epoxy functional group and the prisms 104 of the second optical film 102 can have a hydroxyl functional group such that the hydroxyl functional group can open the O-ring of the epoxy functional group to form bonding between the adhesive layer 103 and the prisms 104 of the second optical film 102. On the contrary, the photo-curable material of the adhesive layer 103 can have a hydroxyl functional group and the prisms 104 of the second optical film 102 can have an epoxy functional group such that the hydroxyl functional group can open the O-ring of the epoxy functional group to form bonding between the adhesive layer 103 and the prisms 104 of the second optical film 102.

Embodiment 3

Figure 5:
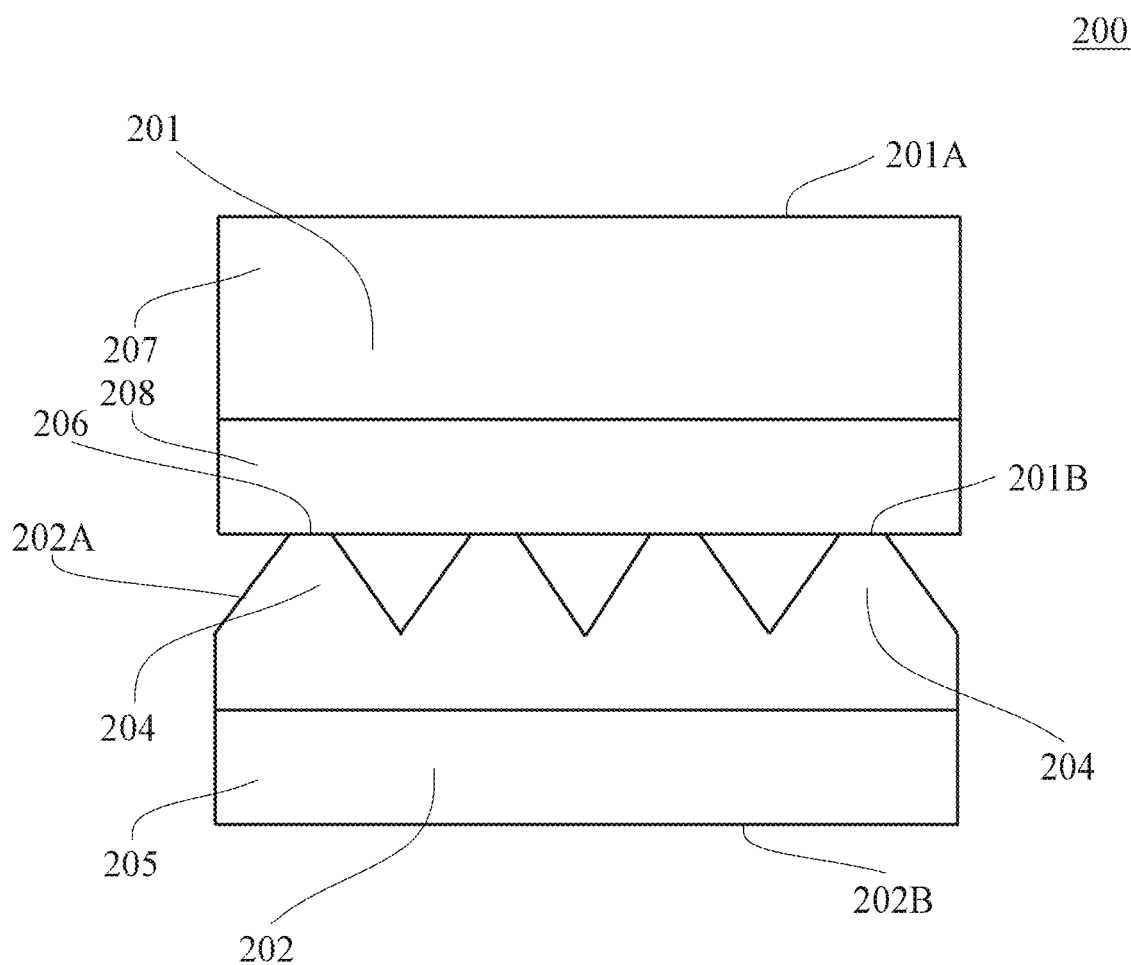
FIG. 5 illustrates a schematic cross-sectional view of an optical assembly in the third embodiment of the present invention.

The present invention also discloses an optical assembly 200 where the microstructures 204 of the second optical film 202 are directly bonded to the first optical film 201. FIG. 5 illustrates a schematic cross-sectional view of an optical assembly 200 in the third embodiment of the present invention. The first optical film 201 has a top surface 201A and a bottom surface 201B. Optionally, the first optical film 201 can further comprise a substrate 208 (e.g., PET substrate) and a plurality of microstructures 207 on the substrate 208. The second optical film 202 has a top structured surface 202A and a bottom surface 202B. Optionally, the second optical film 202 can further comprise a substrate 205 (e.g., PET substrate) and the microstructures 204 (e.g., prisms) disposed on the substrate 205. Compared to the first embodiment and the second embodiment, the bottom surface 201B of the first optical film 201 can have no adhesive layer thereon. The prisms 204 of the second optical film 202 can directly contact the bottom surface 201B of the first optical film 201 to have physical adhesive effects, but the prisms 204 of the second optical film 202 don't be penetrated into the bottom surface 201B of the first optical film 201. In one embodiment, the top of the prism 204 of the second optical film 202 can be designed to have a top planar surface 206 to increase the adhesive force. In another embodiment, a primer surface treatment can be applied to the bottom surface 201B of the first optical film 201 to increase the adhesive force. The adhesive force can be more than 20 g/25 mm. Because there is no adhesive layer, the optical assembly 200 can keep the brightness of the original two optical films which are not bonded to each other. The brightness can be at least 1.80.

EXPERIMENTS

In Examples 1~3, the prisms of the second optical film are not penetrated/inserted into the adhesive layer when adhering the second optical film to the first optical film; in Example 4, the prisms of the second optical film are directly bonded to the backside of the first optical film without using the adhesive layer when adhering the second optical film to the first optical film; in Comparative Example 1, the prisms of the second optical film are penetrated/inserted into the adhesive layer when adhering the second optical film to the first optical film.

Figure 6A:
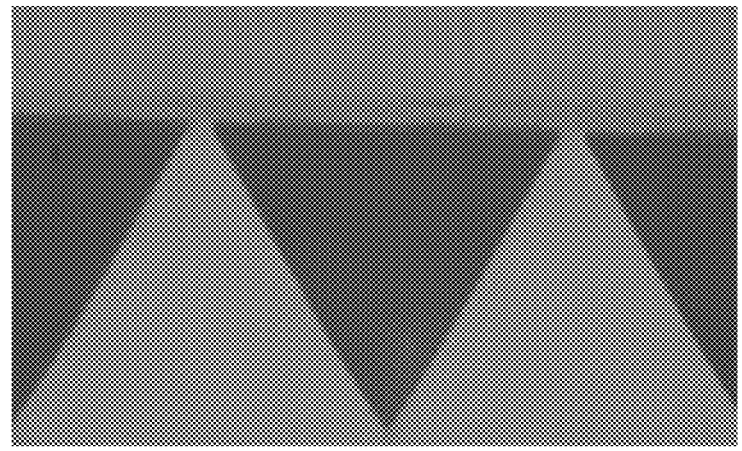
FIG. 6A to FIG. 6C illustrate real cross-sectional views in Example 2, Example 4 and Comparative Example 1.
Figure 6B:
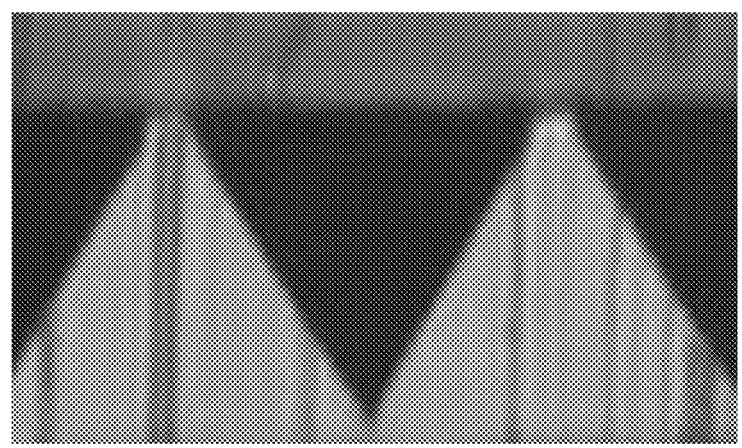
Figure 6C:
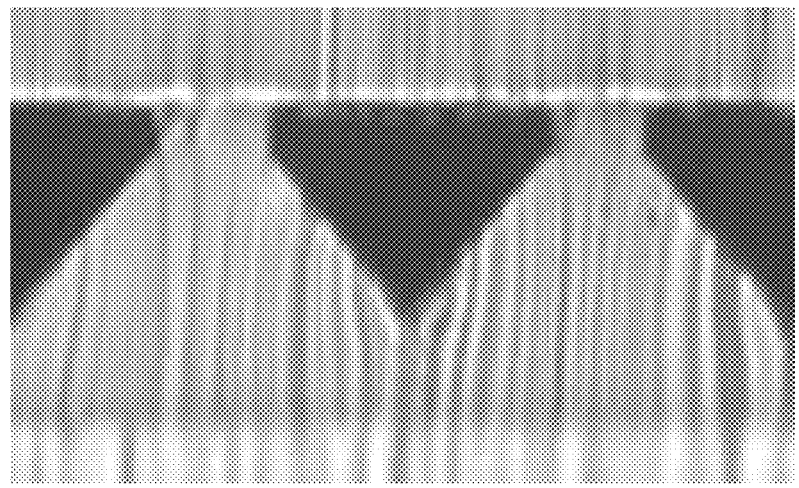

In the examples 1~3, the adhesive layer 103 is made of a combination of 3-(Acryloyloxy)-2-hydroxypropyl methacrylate (G-201P, manufactured by Kyoeisha Chemical Company), Hexamethylene Diisocyanate Trimer (HDT-100, manufactured by Anfong Company) and acrylate oligomer (SY-1063, manufactured by Negamikogyo Company). 3-(Acryloyloxy)-2-hydroxypropyl methacrylate is a thermally-curable material and is 60% the material of the adhesive layer 103 in weight. Hexamethylene Diisocyanate Trimer is a thermally-curable agent and is 10% the material of the adhesive layer 103 in weight. Acrylate oligomer is a photo-curable material and is 30% of the material of the adhesive layer 103 in weight. In the examples 1-3, the prisms 104 of the second optical film 102 are made of Difunctional Epoxy acrylate (RV-280, manufactured by Aekyung Chemical Company), Bisphenol A $(EO)_{10}$ Dimethacrylate (M2101, manufactured by Miwon Company), Tetrahydrofurfuryl Acrylate (M150, manufactured by Miwon Company). Difunctional Epoxy acrylate is 40% of the material of the prisms 104 of the second optical film 102 in weight. Bisphenol A $(EO)_{10}$ Dimethacrylate is 50% of the material of the prisms 104 of the second optical film 102 in weight. Tetrahydrofurfuryl Acrylate is 10% of the material of the prisms 104 of the second optical film 102 in weight. Moreover, photoinitiator 184 is added in each example. After four hours of stirring at normal temperature, proceed to coating, preparing and manufacturing of sample and physical measurement. The measurement result is listed in Table 1 and FIG. 6A to FIG. 6C illustrate real cross-sectional views in Example 2, Example 4 and Comparative Example 1.

Example 1

Use a mixture of the thermally-curable material and the photo-curable material as the material of the adhesive layer 103. Coat the adhesive layer 103 on the bottom surface 101B of the first optical film 101, dry the solvent of the adhesive layer 103 in the oven and the adhesive layer 103 proceeds a thermally-curable crosslink reaction. The dry-film thickness of the adhesive layer 103 is controlled to 0.6~1.0 μm. Use the delicate adhesive roll to adhere the first optical film 101 to the second optical film 102. The prism 104 of the second optical film 102 has a top planar surface 106 with a width of 1 μm. Because the adhesive layer 103 has been thermally-cured, the prisms 104 of the second optical film 102 can't be inserted into the adhesive layer 103. The bottom surface 103B of the adhesive layer 103 has a lot of active acrylate functional groups (maybe the acrylate functional groups of the thermally-curable material or the acrylate functional groups of the photo-curable material) after the thermally-curable crosslink reaction. After the adhesive process, the contact area between the adhesive layer 103 and the top planar surfaces 106 of the prisms 104 of the second optical film 102 proceeds a UV-curable (photo-curable) crosslink reaction to have enough chemical bonding so as to largely increase the adhesive force. The adhesive force can reach 43 g/25 mm. Because the prisms 104 of the second optical film 102 are not inserted into the adhesive layer 103, there is no capillary phenomenon; therefore, the optical assembly 100 has higher brightness (optical gain). The brightness can reach 1.81, as shown in Table 1.

Example 2

Use a mixture of the thermally-curable material and the photo-curable material as the material of the adhesive layer 103. Coat the adhesive layer 103 on the bottom surface 101B of the first optical film 101, dry the solvent of the adhesive layer 103 in the oven and the adhesive layer 103 proceeds a thermally-curable crosslink reaction. The dry-film thickness of the adhesive layer 103 is controlled to 0.6~1.0 μm. Use the delicate adhesive roll to adhere the first optical film 101 to the second optical film 102. The prism 104 of the second optical film 102 has a top planar surface 106 with a width of 3 μm. Because the adhesive layer 103 has been thermally-cured, the prisms 104 of the second optical film 102 can't be inserted into the adhesive layer 103. The bottom surface 103B of the adhesive layer 103 has a lot of active acrylate functional groups (maybe the acrylate functional groups of the thermally-curable material or the acrylate functional groups of the photo-curable material) after the thermally-curable crosslink reaction. After the adhesive process, the contact area between the adhesive layer 103 and the top planar surfaces 106 of the prisms 104 of the second optical film 102 proceeds a UV-curable (photo-curable) crosslink reaction to have enough chemical bonding so as to largely increase the adhesive force. Since the top planar surface 106 increases to 3 μm, the adhesive force is largely improved to reach 72 g/25 mm. Because the prisms 104 of the second optical film 102 are not inserted into the adhesive layer 103, there is no capillary phenomenon; therefore, the optical assembly 100 has higher brightness (optical gain). However, the width of the top planar surface 106 in Example 2 is larger

TABLE 1

| | Example 1 | Example 2 | Example 3 | Example 4 | Comparative Example 1 |
|---|---|---|---|---|---|
| the width of the top planar surface (μm) | 1 | 3 | 5 | 3 | — |
| the thickness of the adhesive layer (μm) | 0.6~0.8 | 0.6~0.9 | 0.6~0.8 | — | 1.0~1.5 |
| brightness (optical gain) | 1.81 | 1.77 | 1.71 | 1.83 | 1.52 |
| adhesive force (g/25 mm) | 43 | 72 | 105 | 24 | 167 |
| wick phenomenon | none | none | none | none | bad | than that in Example 1, the brightness decreases to 1.77 which is lower than that in Example 1, as shown in Table 1.

Example 3

Use a mixture of the thermally-curable material and the photo-curable material as the material of the adhesive layer 103. Coat the adhesive layer 103 on the bottom surface 101B of the first optical film 101, dry the solvent of the adhesive layer 103 in the oven and the adhesive layer 103 proceeds a thermally-curable crosslink reaction. The dry-film thickness of the adhesive layer 103 is controlled to 0.6~1.0 µm. Use the delicate adhesive roll to adhere the first optical film 101 to the second optical film 102. The prism 104 of the second optical film 102 has a top planar surface 106 with a width of 5 µm. Because the adhesive layer 103 has been thermally-cured, the prisms 104 of the second optical film 102 can't be inserted into the adhesive layer 103. The bottom surface 103B of the adhesive layer 103 has a lot of active acrylate functional groups (maybe the acrylate functional groups of the thermally-curable material or the acrylate functional groups of the photo-curable material) after the thermally-curable crosslink reaction. After the adhesive process, the contact area between the adhesive layer 103 and the top planar surfaces 106 of the prisms 104 of the second optical film 102 proceeds a UV-curable (photo-curable) crosslink reaction to have enough chemical bonding so as to largely increase the adhesive force. Since the top planar surface 106 increases to 5 µm, the adhesive force is largely improved to reach 105 g/25 mm. Because the prisms 104 of the second optical film 102 are not inserted into the adhesive layer 103, there is no capillary phenomenon; therefore, the optical assembly 100 has higher brightness (optical gain). However, the width of the top planar surface 106 in Example 3 is larger than that in Example 2, the brightness decreases to 1.71 which is lower than that in Example 2, as shown in Table 1.

Example 4

Example 4 uses no adhesive layer when adhering the second optical film 202 to the first optical film 201. The adhesive UV-type resin is used as the material of the prisms 204 of the second optical film 202. The prism 204 of the second optical film 202 has a top planar surface 206 with a width of 3 µm. The second optical film 202 is directly adhered to the first optical film 201 without using the adhesive layer to directly bond the prisms 204 of the second optical film 202 to the bottom surface 201B of the first optical film 201 to have physical adhesive effects. Preferably, a primer surface treatment is applied to the bottom surface 201B of the first optical film 201. The material of the prisms 204 of the second optical film 202 proceeds a UV-curable (photo-curable) crosslink reaction to have physical adhesion between the prisms 204 of the second optical film 202 and the bottom surface 201B of the first optical film 201. The adhesive force can reach 24 g/25 mm. Because of no adhesive layer, there is no capillary phenomenon; therefore, the optical assembly 200 can keep the brightness of the original two optical films which are not bonded to each other, i.e. the brightness reaches 1.83, as shown in Table 1.

Comparative Example 1

The UV-type resin is used as the material of the adhesive layer. Coat the adhesive layer on the bottom surface of the first optical film, dry the solvent of the adhesive layer and control the dry-film thickness of the adhesive layer to 1.0~1.5 µm. The second optical film is adhered to the adhesive layer by embossing the adhesive roll to insert the prisms of the second optical film into the adhesive layer. The adhesive layer proceeds a UV-curable (photo-curable) crosslink reaction to adhere the prisms of the second optical film to the bottom surface of the first optical film. Because the contact area largely increases, the adhesive force in Comparative Example 1 is better than that in each of Example 1, Example 2 and Example 3. The adhesive force can be improved to reach 167 g/25 mm. Because the prisms of the second optical film are inserted into the adhesive layer, capillary phenomenon induces that the adhesive layer has bad adsorption phenomenon on two sides of the prisms of the second optical film; therefore, the brightness in Comparative Example 1 decreases more than that in each of Example 1, Example 2 and Example 3, i.e. the brightness reaches 1.52, as shown in Table 1.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. An optical assembly, comprising:
a first optical film having a first surface;
an adhesive layer having a second surface and a third surface opposite to the second surface, wherein the second surface of the adhesive layer is disposed on the first surface of the first optical film, wherein the adhesive layer comprises a thermally-curable material and a plurality of light-diffusing particles; and
a second optical film comprising a plurality of microstructures, wherein the adhesive layer is located between the first optical film and the second optical film, wherein the plurality of microstructures comprises a first plurality of prisms and a second plurality of prisms alternating with the first plurality of prisms, wherein a first prism of the first plurality of prisms has a higher peak point than a second prism of the second plurality of prisms, said first prism being immediately adjacent to said second prism, wherein said first prism has a top planar surface that is in contact with the adhesive layer and not penetrating into the adhesive layer that comprises the plurality of light-diffusing particles with said second prism being not in contact with the adhesive layer, wherein the adhesive layer further comprises a photo-curable material, wherein a weight ratio of the thermally-curable material or the photo-curable material to a total weight of the adhesive layer that comprises the thermally-curable material, the photo-curable material and the plurality of light-diffusing particles is more than 50% and less than 100%.
2. The optical assembly according to claim 1, wherein a width of the top planar surface of said first prism is 0.5~10 µm.
3. The optical assembly according to claim 2, wherein the width of the top planar surface of said first prism is 1~5 µm.
4. The optical assembly according to claim 1, wherein a width of the top planar surface of said first prism is 1~3 µm, and a thickness of the adhesive layer is 0.6-0.9 µm, wherein an optical gain of the optical assembly is 1.77~1.81.

5. The optical assembly according to claim 4, wherein an adhesive force between the first optical film and the second optical film is in a range of 43 g/25 mm to 72 g/25 mm.

6. The optical assembly according to claim 1, wherein a width of the top planar surface of said first prism is 1~5 μm, and a thickness of the adhesive layer is 0.6~0.9 μm, wherein an optical gain of the optical assembly is 1.71~1.81.

7. The optical assembly according to claim 6, wherein an adhesive force between the first optical film and the second optical film is in a range of 43 g/25 mm to 105 g/25 mm.

* * * * *